Aug. 6, 1935.  H. PAPST  2,010,411
SCANNING DEVICE
Filed May 2, 1933

Inventor:
Hermann Papst
By Sommers & Young
Attys.

Patented Aug. 6, 1935

2,010,411

UNITED STATES PATENT OFFICE 2,010,411

SCANNING DEVICE

Hermann Papst, St. Georgen, Schwarzwald, Germany

Application May 2, 1933, Serial No. 669,004
In Germany May 2, 1932

6 Claims. (Cl. 178—6)

In connection with television apparatus optical systems have been proposed which consist of two rotating mirror wheels arranged to cause a pencil of light to travel over the image to be transmitted. The more rapidly rotating wheel causes a rapid swinging motion of the pencil of light in one plane while the less rapidly rotating wheel causes a correspondingly slower swinging motion of the pencil in a plane perpendicular to the first mentioned plane.

According to the present invention optical systems of the mentioned character are improved with regard to their construction as well as with regard to their optical properties in order to correspond in a simple manner to the extreme requirements of mechanical accuracy and to increase the optical efficiency.

To this end a reflector prism or mirror is interposed between the mirror wheels which are arranged closely together and positioned substantially at right angles with respect to one another, and one of the mirror wheels is fixed directly on the driving shaft while the other mirror wheel is driven from the driving shaft through worm gearing comprising a single threaded worm and worm wheel. According to the actual norms a minimum accuracy of graduation of at least 0,003 m/m. is required in order that the picture lines shall not cover each other over more than 10% of their surface. But as this measure approaches the practical limit of accuracy which can be mechanically secured, it is not possible to guarantee the required accuracy if two or more worm-gears are provided. By using, however, the arrangement according to the present invention the accuracy is really and reliably secured. The use of a single threaded worm and worm wheel is only rendered possible by providing reflecting means between the two mirror wheels, as such means enables to arrange the mirror wheels closely together. In this way the path of the pencil of light is shortened as much as possible and the light is used to its maximum extent.

The accuracy of the optical system can be further improved thereby that the shaft of the mirror is held under spring pressure acting against the axial forces created during operation, and preferably thereby that the shafts are rotatably mounted between pointed ends.

In order to make the engagement of the worm-gear independent of any backlash, the shaft of the mirror wheel which is driven through the worm-gear may be provided with any kind of brake, f. i. with a frictional spring.

It is further proposed to arrange the mirror wheels not exactly in perpendicular planes, as is usual, but to move the less rapidly rotating wheel out of this relatively perpendicular position by the angle through which it rotates while the pencil of light travels once over the image to be transmitted. Hereby the inclination of the light path due to the continuous rotation of the less rapidly rotating wheel is balanced. The desired relative position of the wheels can be obtained by adjusting the shafts accordingly.

According to a further development of the invention the optical conditions can additionally be improved if the source of light and the reflector are arranged in such a position that the mean light path of the pencil of light lies along the central planes of rotation of the mirror wheels. By this means distortions are brought to a minimum and it becomes possible to use mirror wheels provided with a small number of mirror faces. It is a known fact that the light intensity varies inversely as the fourth power of the number of reflecting surfaces. The reduction in the number of reflecting surfaces therefore means great gain in light.

The object of the invention is illustrated by way of example in the accompanying drawing.

Figures 1, 2, 3:
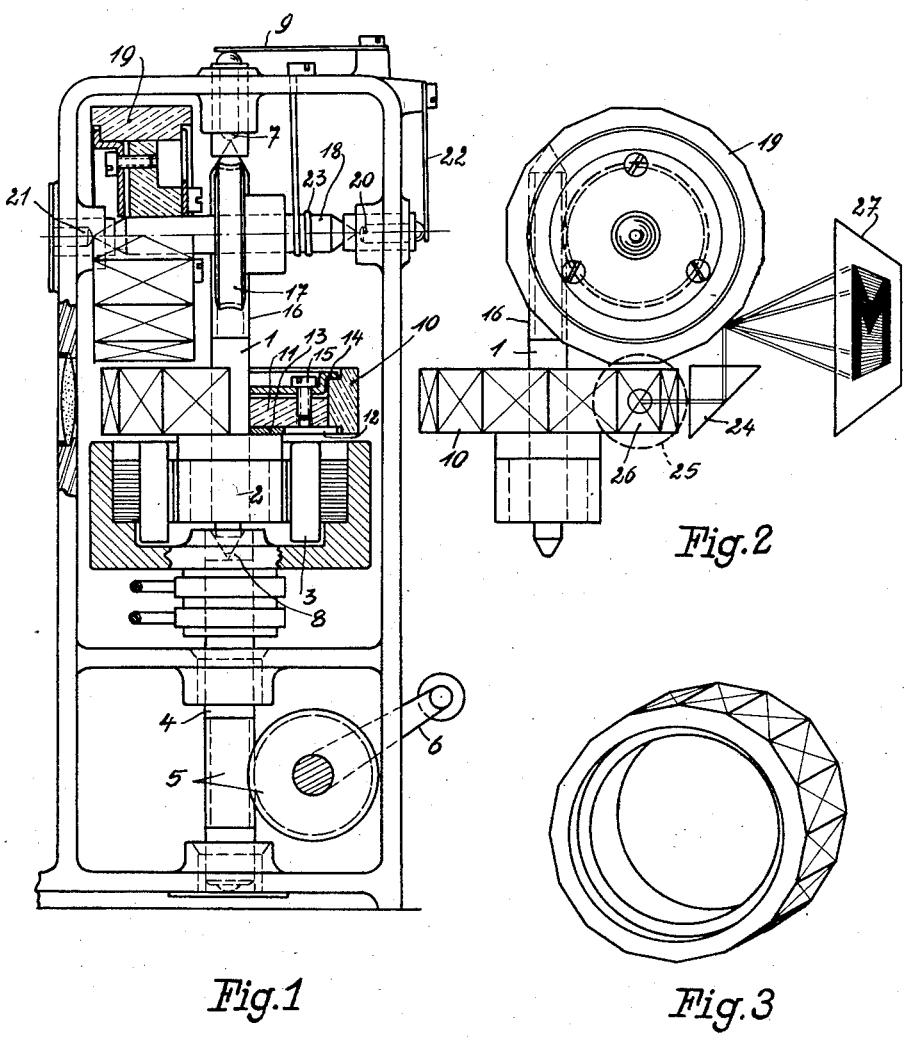
Fig. 1 illustrates the optical system in front elevation several parts being shown in section.
Fig. 2 shows the optical system in side elevation, the frame and the driving mechanism being omitted.
Fig. 3 shows a mirror wheel in perspective view.

The main shaft 1 of the system is driven by the motor 2 the stator 3 of which can be slowly driven by means of the shaft 4 for adjusting purposes as well as rapidly driven by means of the gear 5 and the lever 6 for rapidly starting the driving mechanism of the optical system.

The shaft 1 is mounted between pointed ends 7 and 8. Upon the bearing 7 rests the spring 9 the force of which balances or is slightly greater than the axial force during the operation. The mirror wheel 10 is mounted on the shaft 1 by means of a disc 11, a disc 13 provided with radial elastic arms 12 and a disc 14 which can be adjusted by means of screws 15.

The shaft 1 is provided with a worm 16 of the single-thread type which engages the wormwheel 17 mounted on the shaft 18. The second mirror-wheel is mounted on the shaft 18 in the manner described in connection with the wheel 10.

The shaft 18 is mounted between the pointed ends 20, 21. Upon the bearing 2 rests the spring 22 the force of which balances or is slightly greater than the axial force during the operation.

The shaft 18 is provided with a friction spring 23 which works as a brake and thereby secures an exact cooperation between the worm-wheel 17 and the worm 16 independently of any backlash.

The worm-gear 16, 17 secures the necessary transmission between the mirror wheels 10 and 19.

It is not advisable to arrange the mirror wheels or their shafts exactly perpendicularly to each other, but in such a manner that the inclination of the light lines produced due to the continuous rotation of the wheel 19 is balanced.

As shown in Fig. 2, a prism 24 is arranged between the wheels 10 and 19. The prism reflects the pencil of light coming from the mirror surface of the wheel 10 upon the mirror surface of the wheel 19. The pencil of light comes from a source of light 25, shown in dotted lines, and is thrown according to the position shown in Fig. 2 upon the mirror surface 26 of the wheel 10. By the rotating surface 26 the pencil of light is caused to swing in the plane of the wheel 10. By the wheel 19 the pencil of light is directed to the image 27 to be transmitted, from which it is reflected to a photoelectric cell (not shown).

It will be understood that the device shown and described can also be used in apparatus for reproducing the images transmitted.

What I claim is:

1. Optical system for use in the transmission of pictures by electricity comprising two mirror wheels arranged to cause a pencil of light to travel over the image to be transmitted and positioned closely together and substantially at right angles with respect to one another, one of the mirror wheels being directly mounted on a driving shaft and the second mirror wheel being mounted on a shaft connected with the said driving shaft through a single worm-gearing of the single-threaded worm type, and a reflector interposed between the mirror wheels.

2. Optical system for the transmission of views as defined by claim 1 in which means are provided for holding the shafts of the mirror wheels under axial pressure, the direction of this pressure being oposite the axial forces created during the operation of the transmitting device.

3. Optical system for the transmission of views as defined by claim 1 in which the shaft of the said second mirror wheel is provided with braking means.

4. Optical system for the transmission of views as defined by claim 1 in which the less rapidly rotating mirror wheel is tilted out of the perpendicular position with regard to the other mirror wheel through the same angle through which it rotates while the pencil of light travels once over the image to be transmitted.

5. Optical system for the transmission of views as defined by claim 1 in which the mirror wheels are adjustably mounted on their shafts so as to be able to be tilted into a definite angular position with regard to their shafts.

6. Optical system for use in the transmission of pictures as defined by claim 1 in which a source of light and the reflector are arranged in such a position that the mean light path of the pencil of light lies along the central planes of rotation of the mirror wheels.

HERMANN PAPST.